United States Patent [19]
Zbytniewski et al.

[11] Patent Number: 5,937,366
[45] Date of Patent: Aug. 10, 1999

[54] SMART B-I-T (BUILT-IN-TEST)

[75] Inventors: John Zbytniewski, Huntington; Charles H. Cooper, Bohemia, both of N.Y.

[73] Assignee: Northrop Grumman Corporation, Los Angeles, Calif.

[21] Appl. No.: 08/834,558

[22] Filed: Apr. 7, 1997

[51] Int. Cl.⁶ .............................. G06F 11/00; G01R 31/28
[52] U.S. Cl. ...................... 702/108; 371/20.4; 371/22.5; 371/67.1; 714/51; 714/48
[58] Field of Search ................. 702/108; 371/20.1–20.5, 371/22.1–22.5, 48, 67.1; 395/183.1, 183.5; 714/48–57

[56] References Cited

U.S. PATENT DOCUMENTS 4,727,549  2/1988  Tulpule et al. ..................... 371/25.1
5,652,754  7/1997  Pizzica ............................. 371/22.4

Primary Examiner—Kamini Shah
Attorney, Agent, or Firm—Scully, Scott, Murphy & Presser

[57] ABSTRACT

A smart built-in-test device for classifying fault behavior in electronic systems comprising a temporal monitor monitoring fault, classifying fault behavior and generating fault behavior data as the system operates in real time; one or more sensors for measuring environmental stress conditions in real-time and outputting environmental stress condition data. A fault correlator device for receiving the fault behavior data and the environmental stress condition data and correlating fault behavior to environmental stress conditions to determine if significant correlation exists.

29 Claims, 6 Drawing Sheets

SMART B-I-T (BUILT-IN-TEST)

BACKGROUND OF THE INVENTION

1. Field of the Invention

The present invention relates generally to "smart" built-in-test techniques for automatic testing of electronic equipment, and specifically, the implementation of improved smart built-in-test techniques that monitor and correlate real-time fault and environment data for precise classification of fault behavior as OK, Intermittent, or HARD.

2. Description of the Prior Art

In aircraft avionics, high rates of Cannot Duplicates (CND's), i.e., failures in flight that cannot be verified on the ground, and Retest OK's (RTOK's), i.e., units which fail testing on the aircraft but test good in the maintenance shop, lead to excessive line and shop maintenance times, and maintenance equipment loading. This, in turn, results in decreased sortie rates, long logistic tails, and higher life cycle cost.

These problems have been addressed by the development of BIT (Built-in Test) technology whose techniques have led to the conclusion that intermittent faults are a major cause of many of the CND's and RTOK's.

Conventional avionics uses Built-in-Test (BIT) filters (software routines) to counter-act intermittent failures. However, BIT filters do not properly classify an intermittent fault as Intermittent. This may result in Fault Detection (FD) and Fault Isolation (FI) errors. More specifically, if an intermittent fault occurs, conventional BIT techniques declare an OK if the BIT filter does not trip, or HARD if it does trip. Most of the current effort to combat the CND and RTOK problems have been spent on improving Fault Detection (FD) and Fault Isolation (FI). While FD and FI are part of the solution, they are not the complete solution because intermittent failures are a major part of the problem. In addition, "band-aid fixes" that do address the intermittent failure problem often create problems of their own.

One of the most serious disadvantages of conventional BIT filters is the two-state behavior classification of Line Replaceable Units (LRUs), Weapons Replaceable Assemblies (WRAs) and Line Replaceable Modules (LRMs) as good (OK) or hard faulted (HARD). If a hard fault (HARD) is declared, conventional BIT uses hard fault diagnostic logic to isolate the fault even if the fault is intermittent, this results in fault isolation errors which cause CND and RTOK problems.

Thus, it would be highly desirable to implement a Smart BIT methodology that performs a three-state fault classification including OK, Intermittent, or HARD fault states. Knowing the true fault behavior that is occurring allows proper diagnostic procedures to be used for fault isolation and avoids the use of hard fault diagnostic procedures when intermittent faults are occurring.

SUMMARY OF THE INVENTION

It is an object of the present invention to provide an improved Smart BIT system that utilizes a three-state fault classification: OK, Intermittent, or HARD.

It is another object of the instant invention to provide an improved Smart BIT system that incorporates a Temporal Monitor (TM) device at a low level (within the WRA, for e.g.) to replace conventional BIT filtering and to properly classify intermittent fault behavior.

It is yet another object of the instant invention to provide an improved Smart BIT system that incorporates a Temporal Monitor device that controls BIT modes so that intermittent fault data is collected at faster rates.

Furthermore, it is an object of the present invention to provide an improved Smart BIT system of a distributed design that, in addition to the Temporal Monitor, incorporates a system level (e.g., mission computer) Fault Correlator (FC) that correlates fault behavior to environmental stress (e.g., vibration), when applicable, for enhanced fault classification.

It is still another object of the present invention to provide an improved Smart BIT system that incorporates a Fault Correlator that uses hypothesis testing on correlation estimates to determine if significant correlation exists.

Still another object of the invention is to provide an improved Smart BIT system that properly classifies intermittent faults as Intermittent and only uses hard fault diagnostic logic when it is appropriate. Intermittent fault diagnosis is assisted by performing fault correlation with the FC, the results of which are passed to ground maintenance so that more appropriate diagnostic steps may be taken.

Moreover, it is an object of the present invention to provide an improved Smart BIT system that is readily integrated into both conventional (WRA/LRU) and modern integrated rack (LRM) military and commercial architectures.

These and other objects of the present invention are obtained with a Smart Built-In-Test device which can determine intermittent faults caused by one or more environmental stress conditions induced in aircraft avionics systems operating in real-time. The Smart Built-In-Test device comprises a Temporal Monitor device for monitoring and acquiring BIT data as the system operates and employing means for classifying the acquired BIT data as OK, Intermittent or Hard. Additionally, the Temporal Monitor device changes states when intermittent data is detected and forwards the intermittent fault data to a system level fault correlator device that correlates intermittent fault behavior to environmental stress conditions.

DETAILED DESCRIPTION OF THE PREFERRED EMBODIMENT

Figure 1:
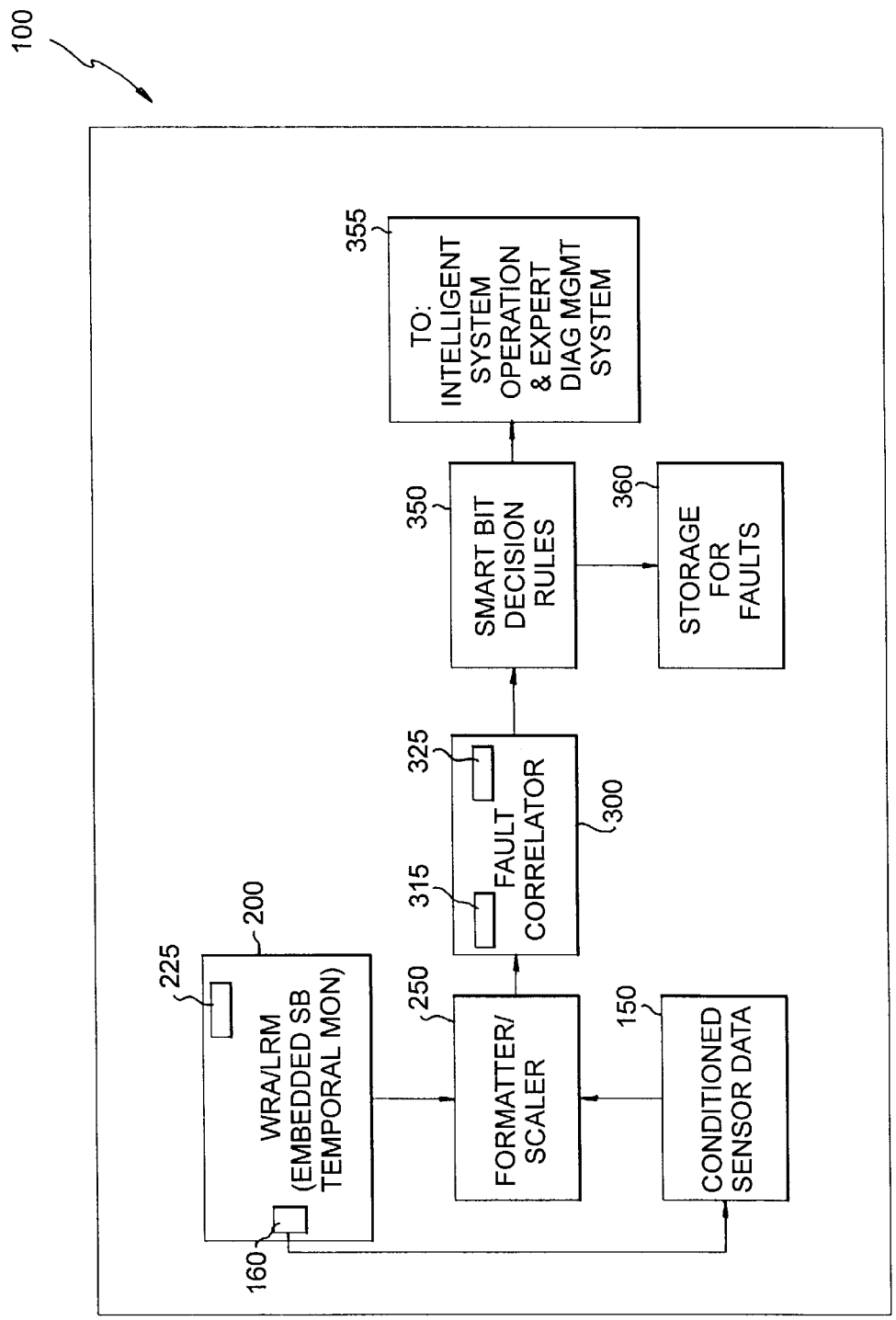
FIG. 1 illustrates the Smart Built-in-test ("SM BIT") system 100 of the present invention.

FIG. 1 illustrates an embodiment of the inventive Smart Built-In-Test ("SM BIT") system 100 for classifying environmentally induced intermittent faults in an aircraft avionics systems. As shown in FIG. 1, the SM BIT is of a distributed design and integrates two key components: the Temporal Monitor 200 ("TM"), embedded at the WRA/LRU or LRM level, to monitor and acquire fault data induced by environmental stresses (e.g., temperature, vibration); and, the Fault Correlator 300 ("FC"), that performs statistical analysis of the fault and environmental stress data and comprises linear regression techniques 315 and hypothesis testing techniques 325 that are implemented at the mission control level for correlating the TM detected fault data (preferably fault transition counts) to sensed environmental stresses. The FC algorithm estimates a correlation factor of fault parameters to environmental parameters, and uses hypothesis testing on the correlation estimate to determine if significant correlation exists. After correlation, the TM and FC results are reported to a diagnostic system.

More specifically in FIG. 1, the SM BIT system includes sensor devices, located in the WRA/LRM and collectively indicated as element 150, for sensing environmental conditions including vibration and temperature, and operating with respect to a sync strobe 160 provided by the embedded SM BIT. The sensor data and SM BIT data collected by the Temporal Monitor 200 is fed into a formatter scaler block 250 that pre-processes the TM fault data and conditioned sensor data for communication to the Fault Correlator 300. Communication of data may be performed serially over an RS-232 line or over a communication bus such as a MIL-STD 1553 bus (not shown). It should be understood to those skilled in the art that communication of data may be accomplished in a myriad of ways including those mentioned above.

The embodiment illustrated in FIG. 1 further includes a unit for implementing SM BIT decision rules, indicated as element 350 in FIG. 1, which can be stand-alone or included as part of the Fault Correlator 300. The SM BIT decision rules determine the status of the fault behavior and forwards the data to other systems 355 for further processing and/or diagnostic evaluation. Additionally, disk storage, indicated as element 360 in FIG. 1, is provided for storing the fault information and behavior over time. Each of the above-described Smart BIT TM and FC devices will be described in further detail below.

The SM BIT system 100 preferably has three (3) modes of operation: a Normal mode for providing initial fault detection at the lower WRA/LRM level in a manner as performed by conventional BIT devices; a Cycle-On-Test mode implemented at the lower WRA/LRM level for determining fault behavior (wherein the TM 200 of the SM BIT system replaces conventional BIT filters); and, a Fast Cycle-On-Test mode implemented at the lower WRA/LRM level for fast data collection and at a higher system level (FC 300) for correlation analysis of significant intermittent faults only. The low-level SM BIT determines true fault behavior and if a significant intermittent failure is declared the low-level BIT collects data at an accelerated rate and transmits the pre-processed data to the high-level FC 300 for performing fault correlation.

TEMPORAL MONITOR

Figure 2:
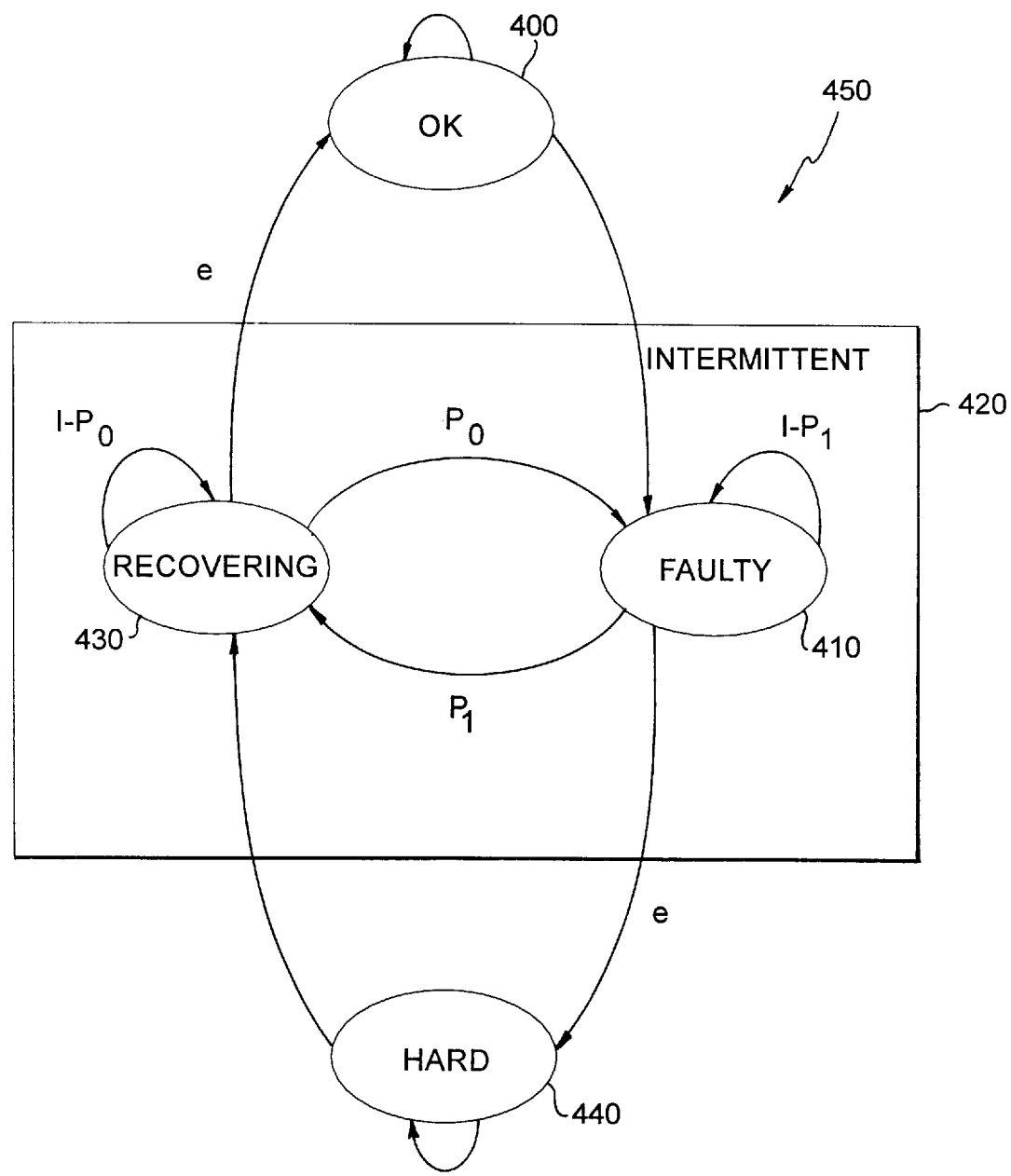
FIG. 2 illustrates a Markov model of intermittent behavior used to estimate transition probabilities.

The TM 200 of the SM BIT 100 is a finite state machine having three states: OK, Intermittent, and HARD. The TM 200 estimates transition probabilities and uses a Markov model of intermittent behavior 450, as shown in FIG. 2, and Bernoulli random variable theory to determine how many consecutive faults constitute a transition to a HARD state 440, or, how many consecutive OK's constitute a transition to the OK state 400. As shown in FIG. 1, the TM 200 includes transition probability estimator algorithms 225 for classifying the faults and initiating appropriate action for further diagnostics. For instance, while in the Normal BIT mode, BIT operates preferably at a 50 ms cycle (a typical LRU/WRA BIT rate) for monitoring any fault activity. If a fault is detected, the BIT changes state to continue cycling on the same test (Cycle-On-Test mode), preferably at the same frequency.

Figure 3A:
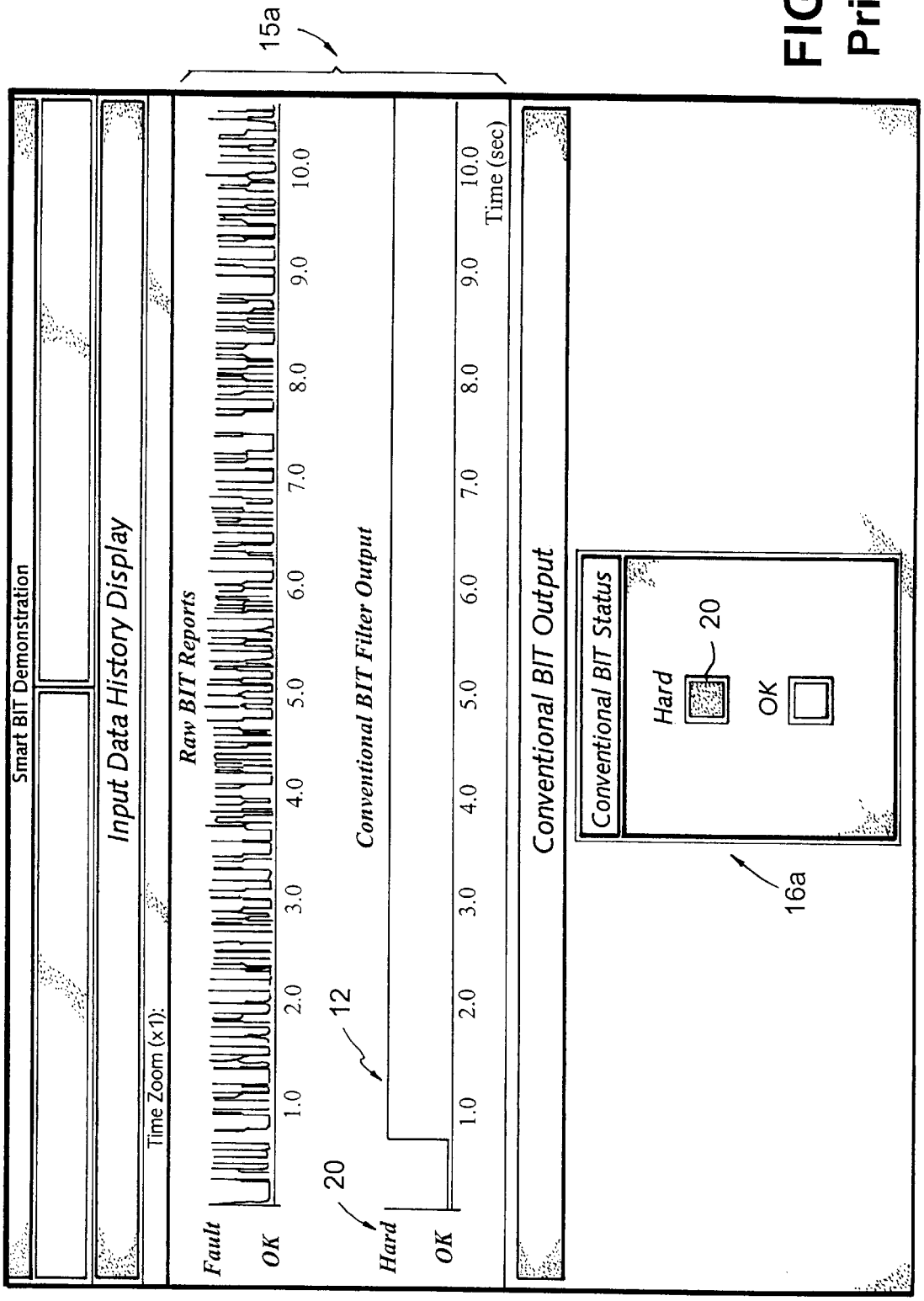
FIG. 3(a) and FIG. 3(b) illustrate display windows of conventional BIT devices that make only OK state (FIG. 3(a)) and HARD fault state (FIG. 3(b)) determinations.
Figure 3B:
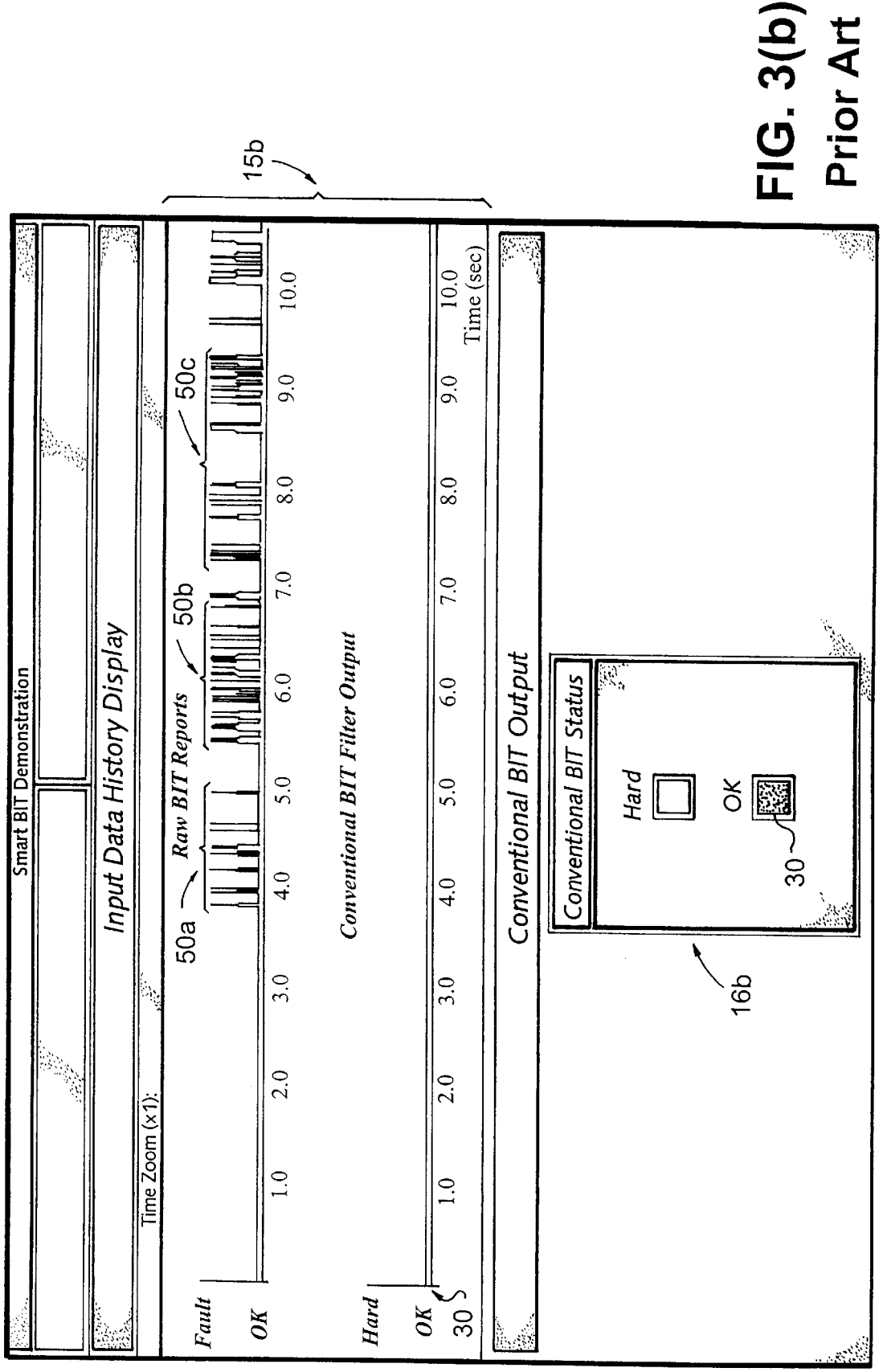

In conventional BIT filters, BIT failures that occur for a predetermined fixed number or count will report a fault as HARD 20 as illustrated in FIG. 3($a$) by the filter output 12 shown in the illustrative display windows 15$a$ and 16$a$. As mentioned above, the conventional BIT output will never classify a series of faults as Intermittent. Alternatively, as shown in FIG. 3($b$), there may be serious intermittent faults occurring in the form of short bursts, indicated as signals 50$a$, 50$b$, 50$c$, etc., that never trip the BIT filter and avoid detection in the process, as indicated by the OK state 30 of the BIT filter output in the output display windows 15$b$ and 16$b$ of FIG. 3($b$).

In the TM 200, if faults start to occur the transition from the OK state 400 to the Faulty sub-state 410 of the Intermittent state 420 occurs immediately. In addition, the TM 200 switches to Cycle-On-Test mode so that the failed test is continually repeated.

While in the Intermittent state 420, a moving average estimator function 225 estimates Faulty transition probability and Recovering transition probability in real time. The Faulty transition probability is estimated by dividing the number of faults by the number of test cycles (faults/cycles). The Recovering transition probability is estimated by dividing the number of OKs by the number of test cycles (OKs/cycles). An initial estimate is based upon a set of ten test cycles. Every ten cycles thereafter makes a new set which is combined with previous sets to obtain new estimates. A maximum of ten sets are combined to obtain an estimate. Every new set after ten is used to obtain a new estimate which includes the previous nine sets, thereby obtaining a moving average estimate consisting of the ten most current sets.

For the Faulty sub-state 410, by setting a policy (eg. 95% or greater) and using Bernoulli random variable theory, the number of consecutive faults to wait for before transitioning to the HARD state 440 can be calculated using the formula:

$$k1 = \log(1-Pk)/\log(1-p1)$$

where p1 is the estimated probability of transitioning to the RECOVERING state, Pk is the probability of the transition occurring within first k test cycles (set to 0.95 or greater as policy). If the count k is exceeded, then transition is made to the HARD state 440.

Similarly, for the Recovering sub-state 430, by setting a policy (e.g. 95% or greater) and using Bernoulli random variable theory, the number of consecutive OKs to wait for before transitioning to the OK state 400 can be calculated using the formula:

$$k2 = \log(1-Pk)/\log(1-p2)$$

where p2 is the estimated probability of transitioning to the FAULTY state, and Pk is the probability of the transition occurring within first k test cycles (set to 0.95 or greater as policy). If the count k is exceeded, then transition is made to the OK state 400.

If neither count is exceeded, then the system remains in the Intermittent state 420 and keeps updating the transition probability estimates as it continually transitions from the Faulty sub-state 410 when a fault is detected, to the Recovering sub-state 430 when no fault is detected, and back again.

If a significant Intermittent fault is determined (lasting more than ten BIT cycles), then the sampling rate is increased (Fast Cycle-On-Test mode) and the fault data and environment data are pre-processed and forwarded to the FC 300, where a determination of intermittent fault correlation may be ascertained after performing fault correlation with the FC 300.

FAULT CORRELATOR

As mentioned briefly above, the Fault Correlator 300 of the invention essentially performs the function of estimating a correlation factor of fault parameters to environment parameters using pre-packaged linear regression techniques, indicated as block 315 in FIG. 1; and, implements a hypothesis testing method on the correlation estimate to determine if significant correlation exists, as indicated by the block 325 in FIG. 1.

In the preferred embodiment, commercially available linear regression techniques are used to estimate a correlation factor "R" between two parameters: BIT fault transition counts, and vibration amplitude ("$G_{rms}$"). The magnitude of the fault correlation factor "R" is indicative of the degree of correlation between the two parameters. The closer the number is to "one", the greater the correlation.

A hypothesis testing algorithm is then used to determine if significant correlation exists. Based on a significance level (e.g. 0.05) a test is made to determine if the correlation factor (p) for the population is equal to zero (0) indicating no significant correlation. The following equations and definitions are implemented in the hypothesis testing algorithm 325:

Given that
p=Correlation Coefficient for Population
R=Estimated Correlation Coefficient of p
n=Number of Samples and using a change of variables such that $$Z=0.5 \log_e[(1+R)/(1-R)]$$

results in a Normal distribution where the mean, $m_z$, and standard deviation, $s_z$, are:

$$m_z=0.5 \log_e[(1+p)/(1-p)]$$

$$s_z=1/(n-3)^{1/2}$$

Thus, for the hypothesis that p=0 (no correlation)

and for a significance level of 0.05, which allows for an estimate error of $2s_z$ (two times the standard deviation), the critical value of Z, i.e. $Z_c$ is calculated as by the formula for $s_z$, as follows:

$$Z_c=2s_z=2/(n-3)^{1/2}$$

Thus, if the Fault Correlator 300 determines that $Z>Z_c$, then the hypothesis that p=0 is rejected, i.e., p 0, and there is significant correlation.

Figure 4:
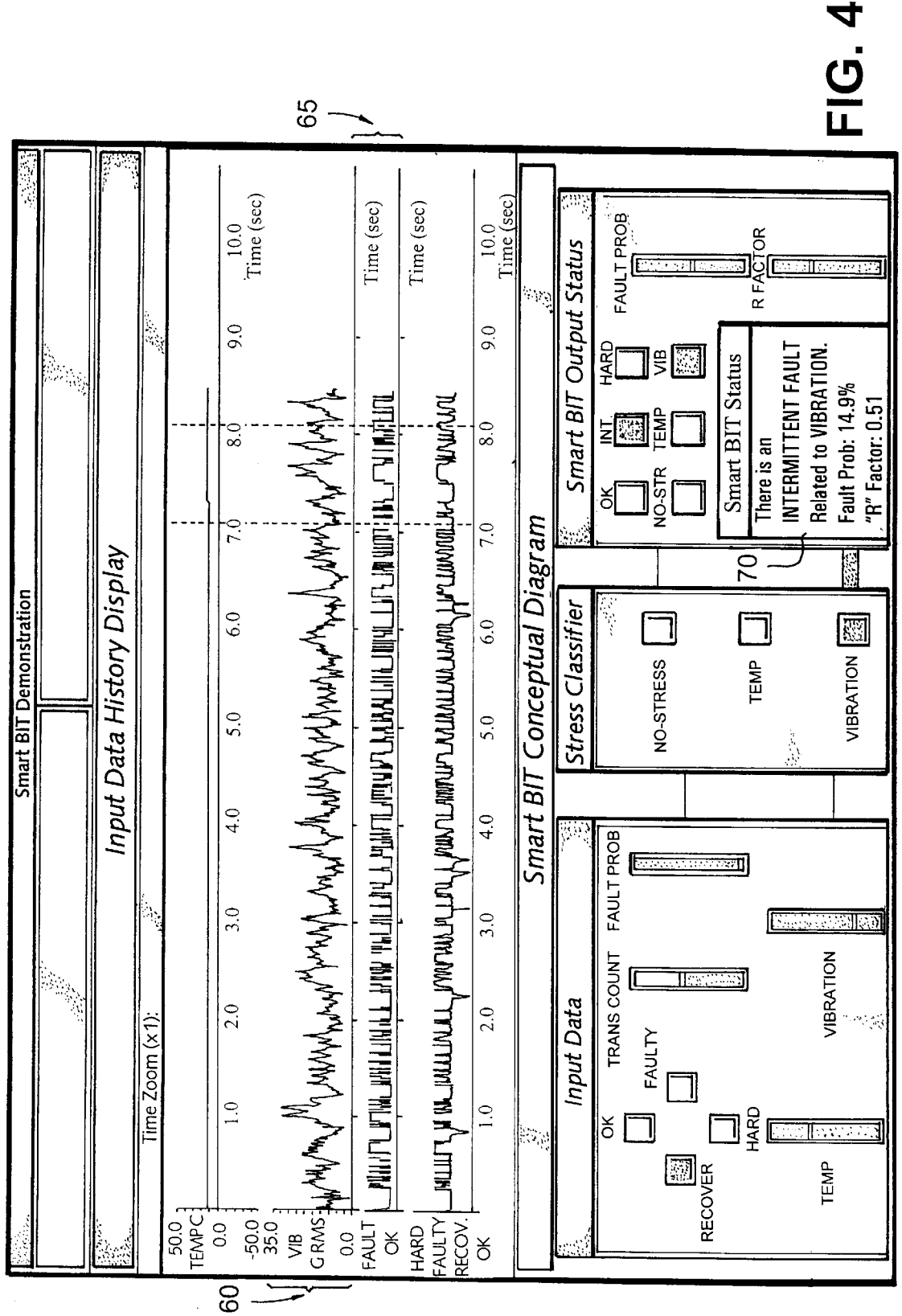
FIG. 4 illustrates an output display window of the Smart BIT device for determining intermittent fault behavior by using the Temporal Monitor to classify the behavior, controlling diagnostic methodology based on fault classification, changing BIT modes to collect data at proper rates, and passing the fault and environmental data to the Fault Correlator to test for significant correlations when applicable.

An example of a display screen showing the determination of an intermittent fault in a test unit 500 incorporating the smart BIT of the invention is illustrated in FIG. 4. As shown in FIG. 4, a real time plot 60 of the vibrational stress parameter ($G_{rms}$) is plotted against corresponding BIT fault determinations 65 output from the Temporal Monitor 200. In the manner described above, the Fault Correlator 300 processes and summarizes the data as indicated in the display view 70. As shown in display view 70, smart BIT has determined that under the given conditions, there is an intermittent fault related to vibration with a fault probability of 50% and a fault correlation factor R=0.57. As described above, the correlation results for the example shown in FIG. 4 were based on detecting faults at a 0.5 msec rate, after a determination by the Temporal Monitor 200 that a significant intermittent fault existed.

Figure 5:
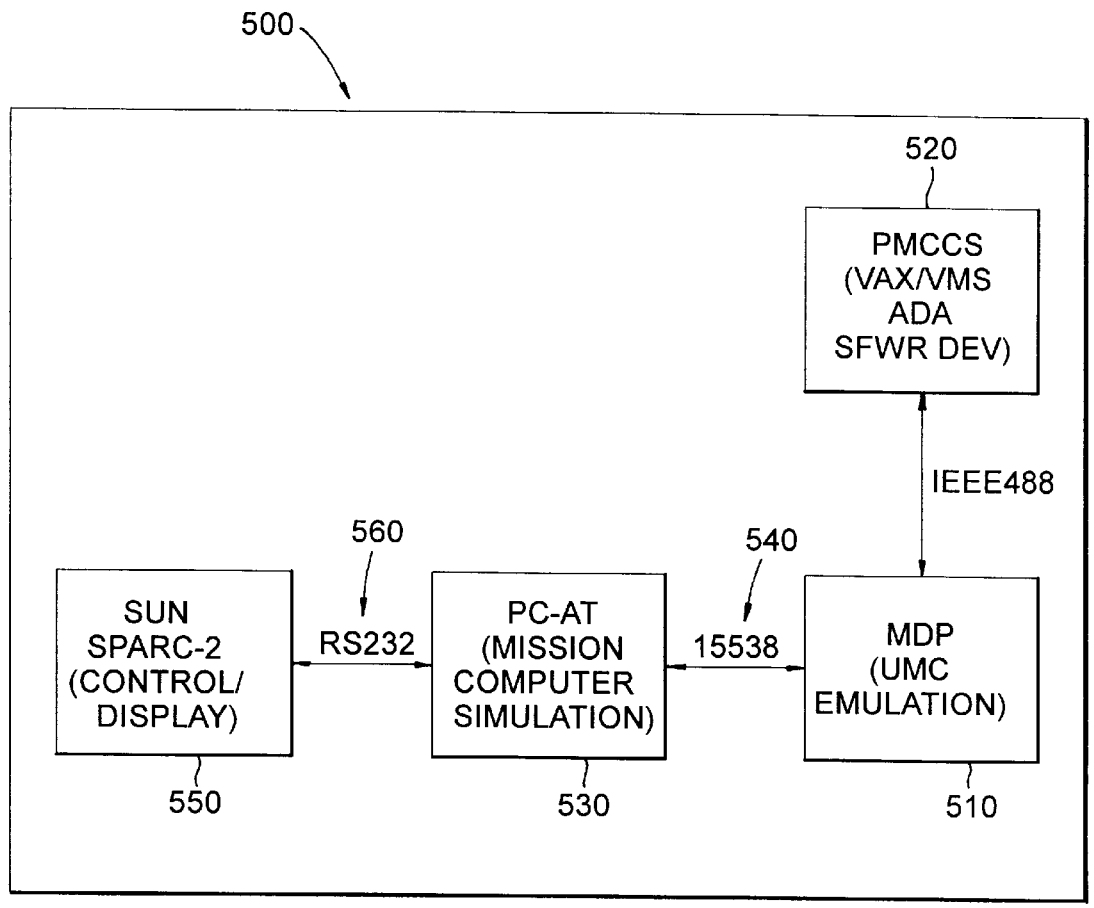
FIG. 5, is a block diagram of the SM BIT system prototype, showing hardware and software functions used to validate and demonstrate SM BIT technology.

FIG. 5 shows a block diagram of a SM BIT prototype 500 which was used as a test bed to validate and demonstrate SM BIT technology.

The Mission Display Processor (MDP) 510, which is used in the F22 Fighter Jet, is a modern architecture integrated rack avionics system with a complement of Line Replaceable Modules (LRM's). LRM's include 1750 processors, memory modules, 1553B bus interface modules, and multipurpose interface modules.

The Performance Monitor/Console Control System (PMCCS) 520 is a software development system used to develop ADA code for the MDP. Using the PMCCS ADA code was written, compiled and downloaded to the MDP for execution.

The PC-AT clone 530 was used to simulate part of the high level mission computer and communicated with the MDP 510 over a 1553B bus 540. The MDP 510 was initialized as the bus controller (BC) and the PC-AT 530 as a remote terminal (RT). The SUN SPARC-2 550 also was a part of the simulation which communicated with the PC-AT 530 over an RS-232 bus 560.

The software developed for the MDP 510 emulated conventional BIT or low-level SM BIT operation as described in detail in previous paragraphs. The low-level SM BIT included a Temporal Monitor, sensor simulation, and formatter/scaler functions. The MDP 510 also was programmed to generate fault/sensor scenarios for testing the system. These fault scenarios were based on unique recordings of actual faults induced in an environmental test lab and recorded in real time along with environmental data. In addition, the Test-Bed 500 had the capability to run fault scenarios with conventional BIT or SM BIT for purposes of comparing results, as shown in FIGS. 3 and 4.

The PC-AT 530 was programmed to simulate part of the mission computer, acting as a remote terminal to the MDP 510. The PC-AT 530 passed temporal monitor results and fault correlation input data to the Sun SPARC-2 550.

The Sun SPARC-2 550 was programmed to run the high-level SM BIT fault correlation functions. It also controlled the modes of the demonstrations and displayed the results of scenario runs as shown in FIG. 4. While the SPARC-2 550 could have performed the PC-AT 530 functions, hardware considerations precluded that possibility.

The Test Bed system 500 was run with many different fault scenarios and successfully validated and demonstrated the SM BIT concepts of the present invention.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. A smart built-in-test device for classifying fault behavior in electronic systems comprising:
   at least one sensor for measuring environmental stress conditions and generating environmental stress condition data; and,
   a temporal monitor for monitoring faults, classifying fault behavior according to a classification scheme including intermittent faults, and generating fault behavior data;
   a fault correlator for receiving said fault behavior data and said environmental stress condition data upon detection of an intermittent fault state, and employing statistical analysis to determine if a significant correlation exists between said fault behavior data and said environmental stress condition data.

2. The smart built-in-test device according to claim 1, wherein said temporal monitor uses transition probability estimates, a Markov model of intermittent behavior having a Hard fault state, an OK state and an Intermittent fault state having a Faulty sub-state and a Recovering sub-state and Bernoulli random variable theory to classify said fault behavior.

3. The smart built-in-test device according to claim 2, wherein said temporal monitor operates in a normal mode where a series of tests are run at a first predetermined rate, and after detection of a first of said faults, which is determined by a failed test, said temporal monitor switches to a cycle on test mode where said failed test is continuously cycled at said first predetermined rate, and wherein after said first fault, said temporal monitor transitions from said OK state to said Faulty sub-state of said Intermittent state.

4. The smart built-in-test device according to claim 3, wherein said first predetermined rate is every 50 milliseconds.

5. The smart built-in-test device according to claim 3, wherein said temporal monitor transitions from said Faulty sub-state to said Recovering sub-state when no fault occurs in a test cycle, and transitions from said Recovering sub-state to said Faulty sub-state when one of said faults occur in one of said test cycles.

6. The smart built-in-test device according to claim 5, wherein said Bernoulli random variable theory is utilized to calculate a first transition count k1, said first transition count being a number of said test cycles to wait before transitioning from said Faulty sub-state to said Hard state, or a second transition count k2, said second transition count being a number of said test cycles to wait before transitioning from said Recovering sub-state to said Ok state, said transition counts, k1 and k2, being calculated using the following formulas:

$$k1=\log(1-Pk)/\log(1-p1)$$

and $$k2=\log(1-Pk)/\log(1-p2)$$

where Pk is a predetermined probability of transition to either said OK state or said Hard state within the first k test cycles, set to at least 95% as policy; p1, Recovering transition probability estimate, is an estimated probability of transition from said Faulty sub-state to said Recovering sub-state; and p2, Faulty transition probability estimate, is an estimated probability of transition from said Recovering sub-state to said Faulty sub-state.

7. The smart built-in-test device according to claim 6, wherein said estimated transition probabilities, p1 and p2, are calculated according to the following formulas:

p1=number of no faults/number of cycles and
p2=number of faults/number of cycles.

8. The smart built-in-test device according to claim 7, wherein said estimated transition probabilities are moving average estimates.

9. The smart built-in-test device according to claim 8, wherein said moving average estimates are calculated as follows:
   an initial one of said estimates is based upon a set consisting of a predetermined number of said cycles; and
   new ones of said estimates are determined after each subsequent set by combining previous, most current ones of said sets up to a predetermined number of sets.

10. The smart built-in-test device according to claim 9, wherein said predetermined number of cycles is ten and said predetermined number of sets is ten.

11. The smart built-in-test device according to claim 3, wherein, after a predetermined number of said test cycles, no transition to the OK state or to the HARD state has occurred, said temporal monitor determines that a significant Intermittent fault has occurred, switches to a fast cycle on test mode where said failed test is cycled at a second predetermined rate, and generates said fault behavior data for input to said fault correlator.

12. The smart built-in-test device according to claim 11, wherein said predetermined number of said test cycles is 10 and said second predetermined rate is every 0.5 milliseconds.

13. The smart built-in-test device according to claim 1, wherein said sensors are selected from a group including vibration and temperature sensors.

14. The smart built-in-test device according to claim 13, wherein said sensors are vibration and temperature sensors.

15. The smart built-in-test device according to claim 1, wherein said environmental stress condition data includes vibration and temperature data.

16. The smart built-in-test device according to claim 15, wherein said sensors are synchronized with said test cycle to generate environmental stress data which is sampled at the same rate as said test cycles.

17. The smart built-in-test device according to claim 1, wherein said statistical analysis includes estimating a correlation coefficient of said fault behavior data to said environmental stress data using linear regression techniques, and using hypothesis testing on said estimated correlation coefficient to determine if significant correlation exist.

18. The smart built-in-test device according to claim 1, wherein said fault behavior data includes fault transition counts which comprise numbers of transitions between an OK state and a Faulty state in a predetermined period, and said environmental stress data includes vibration amplitudes, in Grms, during the same predetermined period.

19. The smart built-in-test device according to claim 18, wherein said estimated correlation coefficient, designated as R, is an estimate of the degree of correlation between said fault transition counts and said vibration amplitudes for a population of samples, and is used in a hypothesis testing algorithm as follows:
Given that,
   p=Correlation Coefficient for Population;
   R=Estimated Correlation Coefficient of p;
   n=Number of Samples;
and using a change of variables such that $$Z=0.5 \log_e[(1+R)/(1-R)]$$

results in a Normal distribution where mean, $m_z$, and standard deviation, $s_z$, are:

$$m_z = 0.5 \log_e[(1+p)/(1-p)]$$

$$s_z = 1/(n-3)^{1/2}.$$

Thus, for a hypothesis that p=0, i.e. no correlation, and for a significance level of 0.05, which allows for an estimate error of two times the standard deviation, $2s_z$, the critical value of Z, i.e. $Z_c$, is calculated as follows:

$$Z_c = 2s_z = 2/(n-3)^{1/2}$$

wherein if $Z > Z_c$, then the hypothesis that p=0 is rejected, i.e. p 0, and significant correlation exists between said fault transition counts and said vibration amplitudes.

20. The smart built-in-test device according to claim 1, wherein the fault correlator tests, in real time, a hypothesis that a correlation factor is zero, said hypothesis tests being based on a number of samples, a significance factor, a probability distribution, and an estimated correlation factor.

21. The smart built-in-test device according to claim 20, wherein said hypothesis test is rejected and said fault correlator reports an environmental related fault.

22. The smart built-in-test device according to claim 20, wherein said hypothesis test is accepted and the fault correlator reports a non-environmental related fault.

23. A smart built-in-test device according to claim 1, further comprising a formatter/scaler for receiving and pre-processing said fault behavior data and said environmental stress condition data, and for transmitting said data to said fault correlator.

24. The smart built-in-test device according to claim 23, wherein said data is transmitted to said fault correlator over a serial communications line.

25. The smart built-in-test device according to claim 24, wherein said serial communications line is an RS-232 line.

26. The smart built-in-test device according to claim 23, wherein said data is transmitted to said fault correlator over a communications bus.

27. The smart built-in-test device according to claim 26, wherein said communications bus is a MIL-STD 1553 Bus.

28. A smart built-in-test device according to claim 1, further comprising a storage device for storing said fault behavior data.

29. The smart built-in-test device according to claim 28, wherein said storage device is a disk drive.

* * * * *